Feb. 8, 1944.  G. W. WALTHER  2,341,251
CONTROL DEVICE
Filed Jan. 15, 1943  2 Sheets-Sheet 1
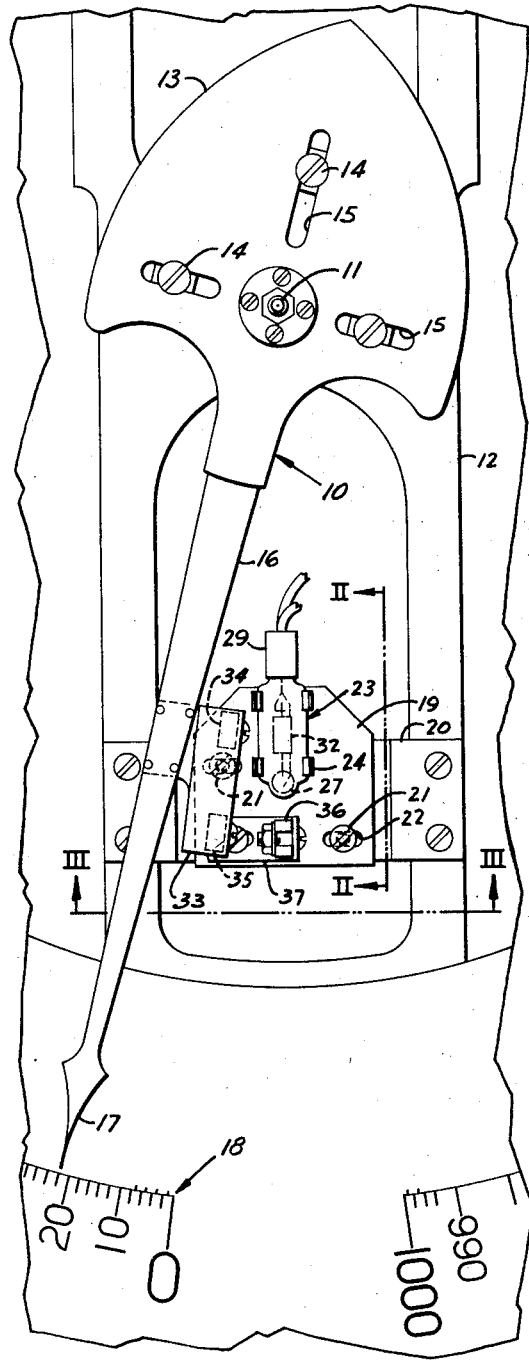
Fig. I
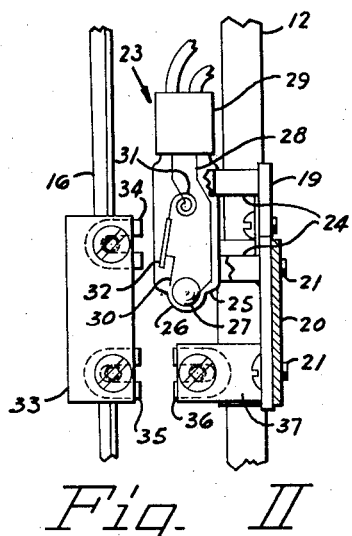
Fig. II
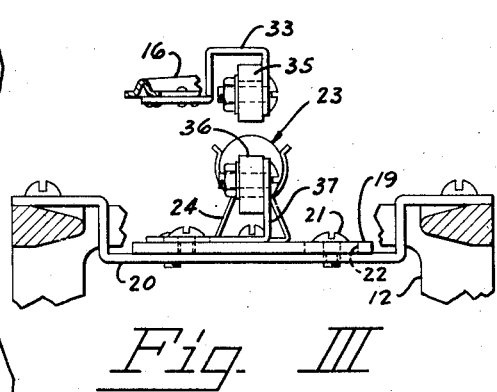
Fig. III
George W. Walther
INVENTOR.
BY Marshall & Marshall
ATTORNEYS Feb. 8, 1944.　　　G. W. WALTHER　　　2,341,251
CONTROL DEVICE
Filed Jan. 15, 1943　　　2 Sheets-Sheet 2
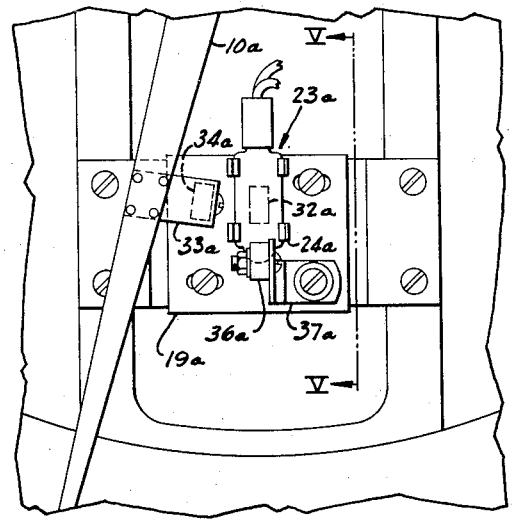
Fig. IV
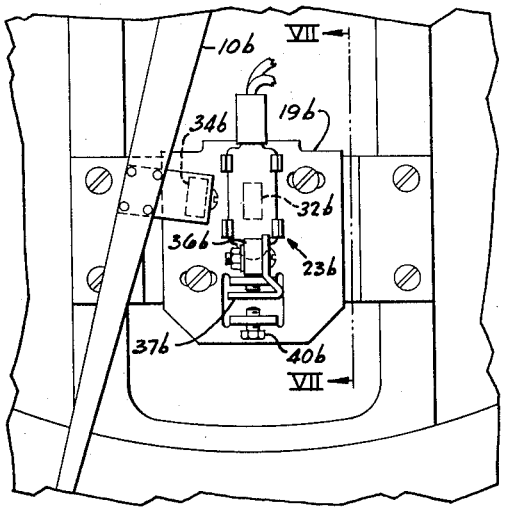
Fig. VI
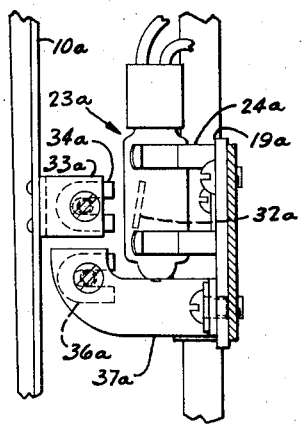
Fig. V
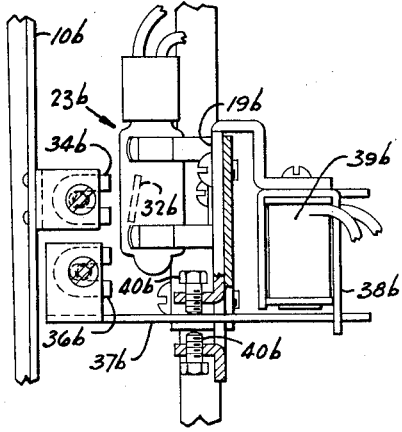
Fig. VII
George W. Walther
INVENTOR.
BY Marshall and Marshall
ATTORNEYS Patented Feb. 8, 1944

2,341,251

UNITED STATES PATENT OFFICE 2,341,251

CONTROL DEVICE

George W. Walther, Toledo, Ohio, assignor to Toledo Scale Company, Toledo, Ohio, a corporation of New Jersey Application January 15, 1943, Serial No. 472,463

6 Claims. (Cl. 200—56)

This invention relates to control devices, and more particularly to means for controlling the operation of magnetic switches which are in turn employed to control the operation of various machines and devices at preselected times in operating cycles or upon the occurrence of selected conditions.

Magnetic switches are of two general types. The first of these is mechanical in nature, usually having two contacts one of which is movable out of and into engagement with the other. This movable contact may carry a small armature. Where greater accuracy, and the elimination of arcing and the resulting pitting of the contacts is desired, magnetic mercury switches are employed. In this type of switch a small globule of mercury is encased in a tube and engaged or engageable by two contacts, one of which usually carries a small magnetically attractable armature. Switches of these types are usually operated by bringing a small permanent magnet into close proximity to the switch and, through the magnetic attraction between the magnet and the armature, moving that contact carrying the armature into or out of engagement with the other contact or the globule of mercury to close or open the switch as the case may be.

A typical use of a magnetic mercury switch is for the control of auxiliary apparatus employed with a weighing scale. For example, it may be desirable to operate such auxiliary mechanism when the load on the weighing scale reaches a certain preselected weight or when a certain amount of material has been fed into a receptacle mounted on the scale. Similarly this type of switch is used to control auxiliary devices associated with other types of measuring and condition-responsive instruments.

The small permanent magnet which actually operates the switch may be mounted upon a condition-responsive element with which the switch is used. When the element and the magnet carried thereby reach predetermined point the attraction of the magnet is sufficient to move the armature carried by one of the two wire contacts of the switch and thus either to break contact or make it, depending upon the type of switch and whether it is to be opened or closed.

In sensitive instruments such as weighing scales the attraction between the permanent magnet and the switch armature, which of course is mutual, not only operates the switch, but also adversely affects the operation of the instrument itself. A condition-responsive element (for example, a weighing scale indicator) usually is connected to the remaining parts of the instrument through mechanism having a high leverage and any slight error at the indicator corresponds to a much larger error at the measuring portion of the instrument. Therefore, every effort must be made to remove friction or other source of error which might cause the indicator to respond incorrectly to the condition under measurement. The attraction between the permanent magnet and the switch armature, while small, contributes appreciably to the difficulty in securing perfect indicator operation. In addition, because the movable armature usually operates in a direction perpendicular to the plane of movement of the magnet which controls it, after it has been attracted toward the magnet, the condition-responsive element on which the magnet is mounted is subjected to the restraining force of the attraction between the magnet and the armature and is held in the position in which it was when the switch was operated. The condition-responsive element, therefore, is not freely under control of the condition and any error in the operation of the device (for example, the operation of the switch a fraction of an increment of value too soon or too late) is not shown by the position of the element after the switch has been operated.

It is an object of this invention to provide a magnetically operated switch and an operating member therefor which can be employed with a sensitive condition-responsive instrument for controlling the operation of auxiliary devices upon the advent of certain preselected conditions and which will not adversely affect the accuracy of the instrument itself.

Another object of this invention is to provide means for counteracting the adverse effect of the magnetic attraction between a magnetically operated switch armature and a switch operating magnet carried by the condition-responsive element of a sensitive instrument.

More specific objects and advantages are apparent from the description, in which reference is had to the accompanying drawings illustrating a preferred form of device embodying the invention.

In the drawings:

Fig. I is a fragmentary view in elevation of the condition-responsive element of a weighing scale equipped with a control device embodying the invention and employed with a mercury type switch.

Fig. II is a fragmentary view in elevation taken substantially from the position indicated by the line II—II and shown on an enlarged scale.

Fig. III is a fragmentary horizontal sectional view taken on the line III—III of Fig. I and shown on an enlarged scale.

Fig. IV is a fragmentary view in elevation of a simplified modification of the invention.

Fig. V is a fragmentary view taken substantially from the position indicated by the line V—V in Fig. IV.

Fig. VI is a view similar to Fig. IV but of another modification of the invention.

Fig. VII is a view similar to Fig. V but taken on the lne VII—VII of Fig. VI.

These specific drawings and the specific description that follows merely disclose and illustrate the invention and are not intended to impose limitations upon the claims.

An indicator 10 (Figs. I, II and III) is secured to a shaft 11 which is in turn journaled in a subframe 12 mounted within the indicator housing of a condition-responsive instrument (in the drawings this is illustrated as a weighing scale). The indicator 10 has a hub 13 which carries balancing weights 14 located in radial slots 15 for the purpose of balancing the indicator to secure accurate response to the conditions under measurement. An arm 16 of the indicator 10 extends radially from the hub 13, terminating in a pointer 17 which cooperates with an annularly arranged series of indicia 18 to indicate values of conditions under observation.

A vertical plate 19 is mounted on a bracket 20 by means of screws 21 which extend through horizontally elongated holes 22 in the plate 19. The bracket 20 is secured to the subframe 12. A magnetic mercury switch 23 is adjustably mounted in clips 24 on the plate 19 adjacent the plane of movement of the indicator arm 16. The switch 23 comprises a glass envelope 25 in the lowermost end of which there is formed a dimple 26 in which is normally positioned a globule of mercury 27. A wire contact 28 extends into the envelope 25 from a switch base 29 which closes the opposite end of the glass envelope 25, the contact extending into the globule 27. A second wire contact 30 which also extends from the base 29 into the interior of the envelope 25 is formed with an integrally constructed spring coil 31 and a small magnetically responsive armature 32. (In the drawings the lower end of the contact 30 is shown as being so constructed that it normally extends into the mercury globule 27, although if it is desired that the switch be closed rather than opened by the control device, the lower end of the contact 30 would be so constructed that it normally would not extend into the globule.)

A small bracket 33, which is riveted to the indicator arm 16, mounts a pair of small permanent magnets 34 and 35. The magnet 34 is secured in place on the bracket 33 and the magnetic mercury switch 23 is vertically adjustable in the clips 24 to locate the armature 32 immediately adjacent the path of movement of the magnet 34.

A third permanent magnet 36 is mounted in a right-angle clip 37 below the magnetic mercury switch 23 on the plate 19 and, similarly to the plate 19, is adjustable horizontally. The magnet 36 is mounted immediately adjacent the path of movement of the magnet 35 which is located on the bracket 33 and the indicator arm 16.

Thus when the preselected condition has been reached and the indicator 10 has been moved to the position which it assumes under such condition, the magnet 34 attracts the armature 32 and thus removes the contact 30 from the mercury globule 27, breaking the circuit controlled by the switch and stopping the operation of whatever auxiliary mechanism is controlled thereby. Of course the attraction between the magnet and the armature reacts on the magnet and thus on the indicator to which it is attached. This reaction is overcome and neutralized by the reaction between the magnets 35 and 36 which are mounted in their respective brackets with their like poles in opposition, i. e., if the north pole of the magnet 35 is uppermost, similarly the north pole of the magnet 36 is at the top. The bracket 19 is horizontally adjustable to vary the position of and correctly locate the magnetic mercury switch with respect to the path of movement of the magnet 34 so that switch will be operated when the condition controlling the indicator reaches the exact predetermined magnitude. Similarly the magnet 36 is adjustable with its bracket 37 on the plate 19 to correctly position the magnet 36 with respect to the magnet 35 so that the repelling force existing between these magnets will exactly equal and neutralize the attracting force existing between the magnet 34 and the armature 32.

The embodiment of the invention disclosed in Fig. IV is designed for use where the instrument with which it is employed is extremely sensitive and where any weight carried by the condition-responsive element must be kept as small as possible. In this modification of the invention, a condition-responsive element 10a carries a bracket 33a on which is mounted a single small permanent magnet 34a.

A magnetic mercury switch 23a is mounted in clips 24a on an adjustably mounted plate 19a. A second permanent magnet 36a is mounted on a bracket 37a which is secured to the plate 19a in such a position that like poles of the magnets 34a and 36a are adjacent when the magnet 34a is in position to operate the switch 23a and move its armature 32a.

The magnet 36a in this embodiment of this invention reacts directly with the main switch actuating magnet 34a to repel this magnet with approximately the same force with which the magnet 34a is attracted towards the armature 32a. The advantage lying in this modification of the invention, as mentioned, is the fact that only one magnet is carried by the condition-responsive member 10a. The effect produced by the two magnets 34a and 36a when arranged as disclosed is substantially identical with that produced by the three magnets 34, 35 and 36 employed in the embodiment disclosed in Figs. I, II and III.

As is mentioned in the above discussion, after the condition-responsive element has been moved to a position where the switch is operated and the switch armature has been moved toward the magnet to effect such operation the attraction between the armature and the magnet increases because the armature moves toward the magnet when the switch is operated. There is applied to the condition-responsive element an even greater force which tends to hold it in the position in which it was located when the switch was operated and thus it is prevented from indicating correctly the amplitude of the condition after the switch has been operated.

To overcome this difficulty the embodiment of the invention disclosed in Figs. VI and VII comprises a hinged bar 37b upon which an auxiliary magnet 36b is mounted. The bar 37b is hinged in a bracket 38b and under the control of a solenoid 39b which moves the bracket between two adjustable stops 40b secured to a switch mounting plate 19b. When a switch actuating magnet 34b which is mounted upon a condition-responsive element 10b is moved into position to operate a magnetic switch 23b it also moves in line with the compensating magnet 36b (the two magnets being arranged with like poles adjacent). The switch operating magnet 34b moves a switch armature 32b to operate the switch but, since the armature moves toward the magnet, the magnetic attraction between the two increases. Therefore, the solenoid 39b is wired into the circuit controlled by the switch 23b and when the switch is operated the solenoid 39b is energized to swing the bar 37b into the position shown in Fig. VII. This moves the compensating magnet 36b closer to the switch actuating magnet 34b increasing the repelling force between the two magnets and thus compensating for the increased attraction between the magnet 34b and the armature 32b. The conditioning responsive element 10b is substantially free of any external forces and is able correctly to indicate the magnitude of the condition under measurement after the magnetic control switch has been operated.

In the drawings the devices are shown as constructed to operate switches when the condition-responsive elements reach zero, but it readily is conceivable that the switches could be positioned adjacent any point in the indicators' path of travel or that more than one of such switches could be employed with a single indicator at the same time, each of them controlling certain pieces of auxiliary mechanism, and similarly that the combination of the magnetic attraction normalizing means afforded by the invention is capable of employment with any switch that is operated by a magnet whether a mercury switch or not.

The embodiments of the invention which have been disclosed may be modified to meet various requirements.

Having described my invention, I claim:

1. A control device for an instrument having a condition-responsive element comprising a magnet mounted on said element, a magnetically operable switch mounted in position to be operated by said magnet when said element reaches a selected position, and means mounted adjacent said switch for repelling said condition-responsive element with force substantially equal to the force of attraction between said magnet and said switch.

2. A control device for an instrument having a condition-responsive element comprising a magnetically operable switch mounted adjacent the path of movement of said element, a magnet mounted on said element for operating said switch and magnetic means mounted adjacent said switch for counteracting the effect on said element of the attraction between said magnet and said switch.

3. A control device comprising an adjustably positionable magnetically operable switch, a controlling magnet therefor mounted on a member movable into position to operate said switch and another magnet mounted adjacent said switch in position to repel the first mentioned magnet with force substantially equal to the force of attraction between the first mentioned magnet and said switch.

4. In a control device comprising a magnetically operable switch which is under the control of a magnet mounted on a member movable into a selected position at which said switch is to be operated, a pair of permanent magnets, the first one of said pair of magnets being mounted on said member and the other of said pair of magnets being mounted alongside said switch in position to react with the first one of said pair of magnets simultaneously with the reaction between the first mentioned magnet and said switch, like poles of said pair of magnets being opposed.

5. A control device comprising an adjustably positionable magnetically operable switch, a controlling magnet therefor mounted on a member for movement into operating position at a selected time, and a pair of magnets, the first of said pair of magnets being mounted on said member and the other of said pair of magnets being mounted alongside said switch in position not to react with said switch and to react with the first of said pair of magnets simultaneously with the reaction between the first mentioned magnet and said switch, like poles of said pair of magnets being opposite when said magnets are in switch operating position.

6. Means for counteracting the adverse effect on a sensitive condition-responsive member resulting from the operation of a magnetic switch by a permanent magnet mounted on said condition-responsive member comprising a pair of magnets, the first of said pair of magnets being mounted on said member and the other of said pair of magnets being mounted with said switch in position not to affect said switch and to react with the first of said pair of magnets simultaneously with the reaction between the first mentioned magnet and said switch, like poles of said pair of magnets being opposed, whereby repulsion between such like poles counteracts attraction between the first mentioned magnet and said switch.

GEORGE W. WALTHER.